United States Patent
Kim et al.

(10) Patent No.: US 9,623,648 B2
(45) Date of Patent: Apr. 18, 2017

(54) METHOD OF DETACHING SUB-SUBSTRATE FROM SUBSTRATE

(71) Applicant: SAMSUNG DISPLAY CO., LTD., Yongin, Gyeonggi-Do (KR)

(72) Inventors: Tae-Hwan Kim, Seongnam-si (KR); Man-Hong Na, Seoul (KR); Jong-Hwan Lee, Seoul (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/731,537

(22) Filed: Jun. 5, 2015

(65) Prior Publication Data

US 2016/0176181 A1    Jun. 23, 2016

(30) Foreign Application Priority Data

Dec. 17, 2014 (KR) .................. 10-2014-0182259

(51) Int. Cl.
*B32B 38/10* (2006.01)
*B32B 43/00* (2006.01)

(52) U.S. Cl.
CPC ............ *B32B 43/006* (2013.01); *B32B 38/10* (2013.01); *B32B 2457/202* (2013.01); *Y10T 156/1132* (2015.01); *Y10T 156/1168* (2015.01); *Y10T 156/1184* (2015.01); *Y10T 156/1944* (2015.01);
(Continued)

(58) Field of Classification Search
CPC . B32B 38/10; B32B 43/006; Y10T 156/1132; Y10T 156/1168; Y10T 156/1184; Y10T 156/1944; Y10T 156/1967; Y10T 156/1978; Y10T 156/1989
See application file for complete search history.

(56) References Cited

U.S. PATENT DOCUMENTS 8,470,129 B1 *  6/2013  Wang ..................... B32B 38/10
                                                       156/705
2004/0166653 A1 * 8/2004  Kerdiles ................ G01N 19/04
                                                       438/458
(Continued)

FOREIGN PATENT DOCUMENTS

KR    10-2011-0090317 A    8/2011
KR    10-2013-0051686 A    5/2013
KR    10-2013-0061485 A    6/2013

*Primary Examiner* — Mark A Osele
*Assistant Examiner* — Nickolas Harm
(74) *Attorney, Agent, or Firm* — Lee & Morse P.C.

(57) ABSTRACT

A method of detaching a sub-substrate from a substrate includes providing a first sub-substrate attached to a first substrate having a rectangular shape with first and second sides extending in a first direction and third and fourth sides extending in a second direction crossing the first direction, inserting a separating member between the first sub-substrate and the first substrate to partially detach therebetween, attaching a plurality of pads arranged in a matrix pattern to the first sub-substrate, lifting first pads among the plurality of pads arranged in a third direction crossing the first and second directions, lifting second pads, at least two of the second pads being arranged in the second direction, and at least two of the second pads being arranged in the third direction, and lifting third pads arranged in the second direction.

18 Claims, 5 Drawing Sheets

(52) U.S. Cl.
CPC .... *Y10T 156/1967* (2015.01); *Y10T 156/1978* (2015.01); *Y10T 156/1989* (2015.01)

(56) References Cited

U.S. PATENT DOCUMENTS

| | | |
|---|---|---|
| 2011/0198040 A1* | 8/2011 | Ebata .................... B65H 41/00 156/750 |
| 2013/0143464 A1 | 6/2013 | Kim et al. |
| 2015/0138494 A1 | 5/2015 | Kim et al. |

* cited by examiner

METHOD OF DETACHING SUB-SUBSTRATE FROM SUBSTRATE

CROSS-REFERENCE TO RELATED APPLICATION

Korean Patent Application No. 10-2014-0182259, filed on Dec. 17, 2014, in the Korean Intellectual Property Office, and entitled: "Method of Detaching Sub-Substrate from Substrate," is incorporated by reference herein in its entirety.

BACKGROUND

1. Field

Example embodiments relate to a method of detaching a sub-substrate from a substrate, and more particularly, to a method of detaching a sub-substrate which is used as a carrier substrate of a liquid crystal display panel from a substrate of the liquid crystal display panel.

2. Description of the Related Art

Generally, flat panel display devices include a liquid crystal display ("LCD") device. The LCD device includes a LCD panel and a backlight assembly providing light to the LCD panel. The LCD panel includes an array substrate on which a plurality of thin-film transistors ("TFTs") is arranged, a color filter substrate on which a plurality of color filters is arranged, and a liquid crystal layer interposed between the array substrate and the color filter substrate.

As the TFT is manufactured at high temperature, a glass substrate having heat resistance and low thermal expansion coefficient is used as a base substrate of the LCD panel. In addition, the glass substrate is inexpensive. However, the glass substrate is easy to break and is difficult to produce thinly. Accordingly, it is difficult to reduce a thickness and weight of a LCD device having a glass substrate.

To reduce the thickness and the weight of the LCD device, a plastic LCD device has been recently developed, in which a glass substrate used as a base substrate of the LCD device is substituted with a plastic substrate. As the plastic LCD device employs a plastic film having a thickness of about 0.6 mm less than that of a glass substrate employed in a conventional LCD device, the plastic LCD device is lightweight and is more flexible, so that the plastic LCD device is not easily broken. In addition, manufacturing costs of the plastic LCD device may be reduced in comparison with a conventional LCD device.

SUMMARY

One or more example embodiment provides a method of detaching a sub-substrate from a substrate capable of preventing damage of a liquid crystal display panel in a process of manufacturing the liquid crystal display panel.

One or more example embodiment also provides a method of detaching a sub-substrate from a substrate capable of easily separating a carrier substrate which is used as the sub-substrate from the substrate of the liquid crystal display panel.

According to an example embodiment, a method of detaching a sub-substrate from a substrate includes providing a first sub-substrate attached to a first substrate, the first substrate having a rectangular shape with first and second sides extending in a first direction and third and fourth sides extending in a second direction crossing the first direction, inserting a separating member between the first sub-substrate and the first substrate to partially detach the first sub-substrate from the first substrate, attaching a plurality of pads to the first sub-substrate, the plurality of pads being arranged in a matrix of a plurality of rows and a plurality of columns, lifting first pads among the plurality of pads, the first pads being arranged in a third direction crossing the first and second directions, lifting second pads among the plurality of pads, at least two of the second pads being arranged in the second direction, and at least two of the second pads being arranged in the third direction, and lifting third pads among the plurality of pads, the third pads being arranged in the second direction.

In an example embodiment, the plurality of pads may include a fixing pad attached to an edge of the first sub-substrate, and the method may further include, before lifting the first pads, separating the edge of the first sub-substrate from the first substrate by lifting the fixing pad, and dropping the fixing pad back on the edge of the first sub-substrate, such that the first sub-substrate contacts the first substrate.

In an example embodiment, a thickness of the first substrate may be about 0.01 mm to about 0.1 mm.

In an example embodiment, a thickness of the first sub-substrate may be about 0.3 mm to about 0.7 mm.

In an example embodiment, a second substrate opposite to the first substrate may be provided. A second sub-substrate attached to the second substrate may be provided. The first substrate may be combined with the second substrate.

In an example embodiment, a thickness of the second substrate may be about 0.01 mm to about 0.1 mm.

In an example embodiment, a thickness of the second sub-substrate may be about 0.3 mm to about 0.7 mm.

According to an example embodiment, in a method of detaching a sub-substrate from a substrate, a first sub-substrate attached to a first substrate having a rectangular shape is provided. The first substrate has first and second sides extending in a first direction and third and fourth sides extending in a second direction crossing the first direction. A separating member is inserted between the first sub-substrate and the first substrate to partially detach the first-sub substrate from the first substrate. A plurality of pads is attached to the first sub-substrate. The plurality of pads is arranged in a matrix of a plurality of rows and a plurality of columns. First pads and second pads are substantially simultaneously lifted among the plurality of pads. The first pads are adjacent to a first edge. The first pads are arranged in a third direction crossing the first and the second directions. The second pads are adjacent to a second edge. The second pads are arranged in the third direction.

In an example embodiment, the plurality of pads may include a first fixing pad attached to the first edge of the first sub-substrate and a second fixing pad attached to the second edge of the first sub-substrate. Before lifting the first and second pads, the first and second edges of the first sub-substrate may be separated from the first substrate by lifting the first fixing pad and the second fixing pad. The first and second edges of the first sub-substrate may be contacted with the first substrate by falling the first fixing pad and the second fixing pad.

In an example embodiment, a thickness of the first substrate may be about 0.01 mm to about 0.1 mm.

In an example embodiment, a second substrate opposite to the first substrate may be provided. A second sub-substrate attached to the second substrate may be provided. The first substrate may be combined with the second substrate.

According to the example embodiments, in a method of detaching a sub-substrate from a substrate, a first sub-substrate attached to a first substrate having a rectangular shape are provided. The first substrate has first and second sides extending in a first direction and third and fourth sides extending in a second direction crossing the first direction. A separating member is inserted between the first sub-substrate and the first substrate to partially detach the first sub-substrate from the first substrate. A plurality of pads is attached to the first sub-substrate. The plurality of pads is arranged in a matrix of a plurality of rows and a plurality of columns. First pads and second pads are substantially simultaneously lifted among the plurality of pads. The first pads are adjacent to a first edge. The first pads are arranged in a third direction crossing the first and second directions. The second pads are adjacent to a second edge. The second pads are arranged in the third direction. Third pads and fourth pads are substantially simultaneously lifted among the plurality of pads. The third pads are adjacent to the first edge. Some of the third pads are arranged in the second direction. The other of the third pads are arranged in the third direction. The fourth pads are adjacent to the second edge. Some of the fourth pads are arranged in the second direction. The other of the fourth pads are arranged in the third direction.

In an example embodiment, the plurality of pads may include a first fixing pad attached to the first edge of the first sub-substrate and a second fixing pad attached to the second edge of the first sub-substrate. Before lifting the first and the second pads, the first and second edges of the first sub-substrate may be separated from the first substrate by lifting the first fixing pad and the second fixing pad. The edge of the first sub-substrate may be contacted with the first substrate by falling the first fixing pad and the second fixing pad.

In an example embodiment, a thickness of the first substrate may be about 0.01 mm to about 0.1 mm.

In an example embodiment, a thickness of the first sub-substrate may be about 0.3 mm to about 0.7 mm.

In an example embodiment, a second substrate opposite to the first substrate may be provided. A second sub-substrate attached to the second substrate may be provided. The first substrate may be combined with the second substrate.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
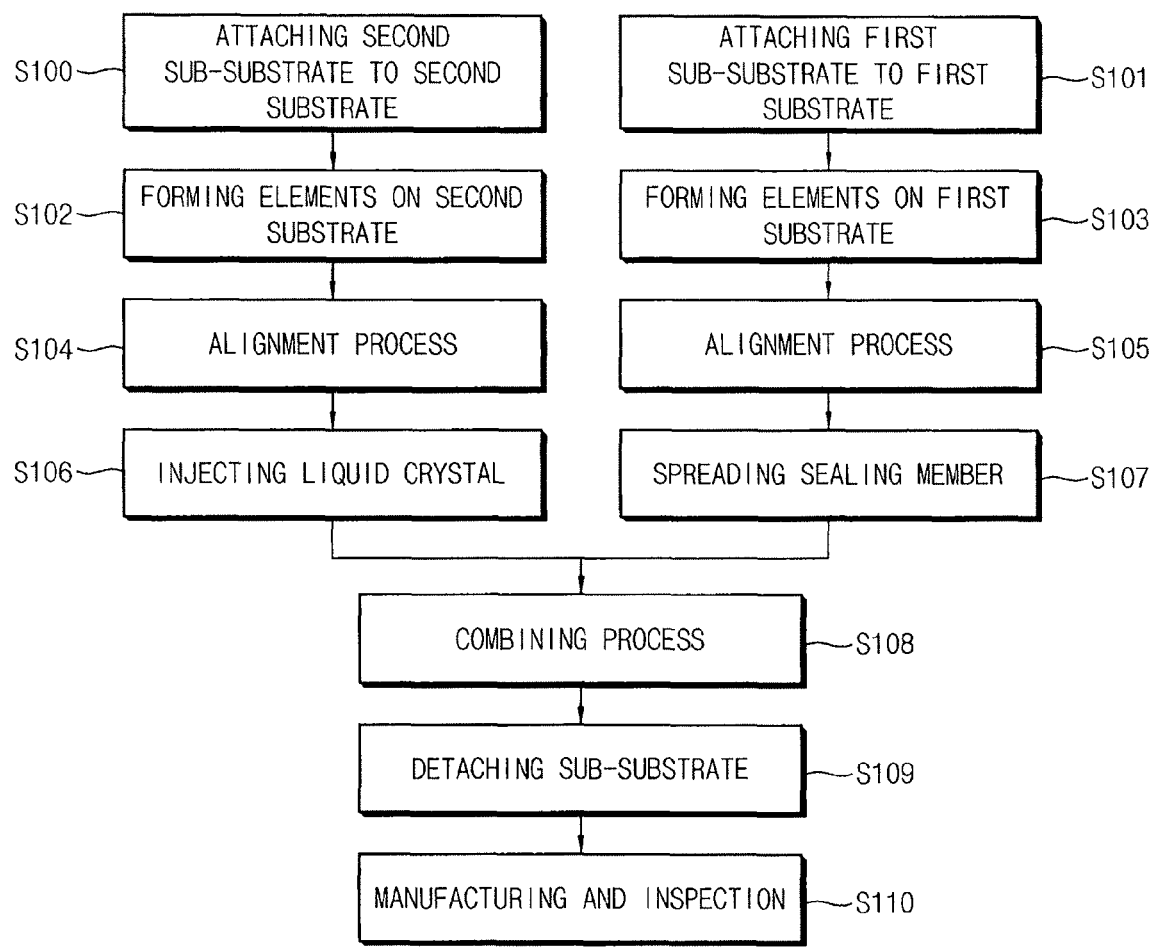
FIG. 1 illustrates a flow chart of a method of detaching a sub-substrate from a substrate in accordance with an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be explained in detail with reference to the accompanying drawings.

FIG. 1 is a flow chart of a method of detaching a sub-substrate from a substrate in accordance with an example embodiment.

Referring to FIG. 1, a first substrate, a second substrate, a first sub-substrate, and a second sub-substrate are provided. The first sub-substrate is attached to the first substrate for forming a liquid crystal display apparatus (operation S101). The second sub-substrate is attached to the second substrate for forming the liquid crystal display apparatus (operation S100).

The first substrate and second substrate may be base substrates that include material which has relatively high transmittance, thermal stability, and chemical compatibility. For example, the first substrate and the second substrate may include at least one of glass, polyethylene naphthalate, polyethylene terephthalate, and polyacryl. A thickness of the first substrate may be about 0.01 mm to about 0.1 mm. A thickness of the second substrate may be about 0.01 mm to about 0.1 mm.

The first and second sub-substrates serve to support the first and second substrates, and to move the first and second substrates, respectively. The first and second sub-substrates are carrier substrates. The first and second sub-substrates may include organic material having hardness capable of being easily used in a process with high temperature. A thickness of the first sub-substrate may be about 0.3 mm to about 0.7 mm. A thickness of the second sub-substrate may be about 0.3 mm to about 0.7 mm.

The first and second sub-substrates may be attached to the first and second substrates, respectively, in a vacuum state. The first and second sub-substrates may be attached by, e.g., electrostatic force, vacuum force, surface tension, etc.

A surface of the first and second sub-substrates may become rough by performing a plasma treatment on the first and second sub-substrates using, e.g., fluorine, etc., or forming prominent patterns on the first and second sub-substrates. Thus, the first and second sub-substrates may be easily attached to the first and second substrate, respectively.

Once the first and second sub-substrates are attached to respective first surfaces of the first and second substrates, functional elements may be formed on respective second surfaces of the first and second substrates. That is, an array substrate is formed of the second substrate (operation S102). For example, the array substrate may include the second substrate attached to the second sub-substrate and at least one switching device, e.g., a thin film transistor, on the second surface of the second substrate. The array substrate may include a plurality of gate lines and a plurality of data lines defining pixel areas, and may be formed by an array process. The thin film transistors are disposed in each pixel area. The thin film transistors are electrically connected to the gate lines and the data lines. A pixel electrode is formed by the array process. The pixel electrode is electrically connected to the thin film transistor to apply a signal to a liquid crystal layer.

Similarly, a color filter substrate may be formed of the first substrate (operation S103). The color filter substrate may be the first substrate attached to the first sub-substrate and at least one color filter. For example, the color filter substrate may include a color filter layer and a common electrode. The color filter layer may include sub-color filters having red, green and blue color.

Once each of the array substrate and the color filter substrate are formed separately, alignment processes are performed on each of the color filter substrate and the array substrate, respectively (operations S104 and S105). That is, alignment layers are printed on the color filter substrate and the array substrate, respectively. Next, a rubbing treatment is performed on the alignment layers. After the rubbing treatment, an anchoring force or surface fixing force, e.g., a pretilt angle and an alignment direction, is provided to liquid crystal molecules of the liquid crystal layer that is formed between the color filter substrate and the array substrate.

A predetermined seal pattern is formed by coating a sealant on the color filter substrate on which the rubbing treatment is performed (operation S107). The liquid crystal layer is formed by dropping liquid crystals on the array substrate (operation S106). Alternatively, the liquid crystal layer may be formed by injecting liquid crystals in vacuum.

Next the array substrate and the filter substrate are attached to each other (operation S108). For example, the color filter substrate, on which the sealant is formed, is attached to the array substrate, on which the liquid crystals are dropped, and simultaneously, pressure is applied onto the color filter substrate and/or the array substrate. The liquid crystals are uniformly dispensed over the entire liquid crystal panel by the pressure. Thus, a liquid crystal display panel is formed. The liquid crystal display panel includes the array substrate, the color filter substrate, and the liquid crystal layer disposed between the array substrate and the color filter substrate.

Once the array substrate and the color filter substrate are attached to each other, the first and second sub-substrates are detached from the respective first and second substrates (operation S109). Next, a plurality of liquid crystal panels is obtained by cutting the substrates to a predetermined size, and each liquid crystal panel is examined, thereby fabricating the LCD (operation S110).

FIGS. 2 to 5 are cross-sectional views of stages in a method of detaching a sub-substrate from a substrate in accordance with an example embodiment. In particular, FIGS. 2 to 5 are cross-sectional views of stages in operation S109 of FIG. 1.

Figure 2:
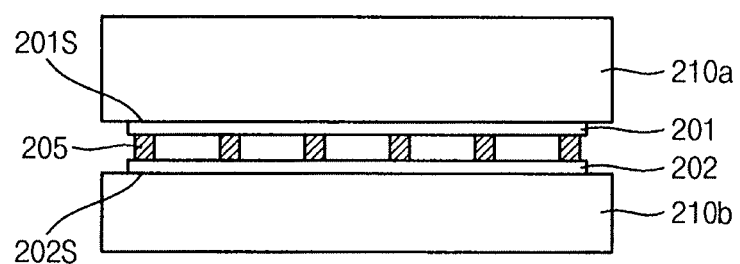
FIGS. 2 to 5 illustrate cross-sectional views of stages in a method of detaching a sub-substrate from a substrate in accordance with an example embodiment.

Referring to FIG. 2, a liquid crystal display panel is provided after operation S108. In detail, the liquid crystal display panel includes a first substrate 201, a second substrate 202 opposite to the first substrate 201, and a seal pattern 205 between the first substrate 201 and the second substrate 202. Further, a first sub-substrate 210a attached to the first substrate 201 of the liquid crystal display panel is provided on an outer surface of the first substrate 201, and a second sub-substrate 210b attached to the second substrate 202 of the liquid crystal display panel is provided on an outer surface of the second substrate 202.

The first substrate 201 may be one of the color filter substrate and the array substrate. The second substrate 202 may be the other one of the color filter substrate or the array substrate.

The array substrate includes the substrate attached to the sub-substrate and a switching device such as a thin film transistor. The array substrate includes a plurality of gate lines and a plurality of data lines defining pixel areas and is formed by an array process. The thin film transistor is disposed in each of the pixel area. The thin film transistor is electrically connected to the gate lines and the data lines. A pixel electrode is formed by the array process. The pixel electrode is electrically connected to the thin film transistor to apply signal to a liquid crystal layer.

The color filter substrate includes a color filter layer and a common electrode. The color filter layer includes sub-color filters having red, green and blue color.

Figure 3:
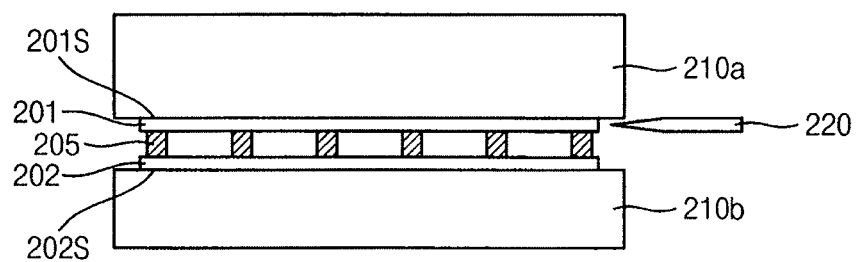

Referring to FIG. 3, the first sub-substrate 210a is partially separated from the first substrate 201 to easily detach the first sub-substrate 210a from the first substrate 201. In detail, a separating member 220 is inserted at a first edge of a first surface 201S between the first sub-substrate 210a and the first substrate 201 to partially detach the first sub-substrate 210a from the first substrate 201. Thus, a condition capable of easily separating the first sub-substrate 210a from the first substrate 201 is formed. For example, the separating member 220 may include a knife having a sharp blade.

The first substrate 201 may have a rectangular shape. As will be described with reference to FIG. 6, the first substrate 201 may have first and second sides extending in a first direction D1 and third and fourth sides extending in a second direction D2 crossing the first direction D1.

Figure 4:
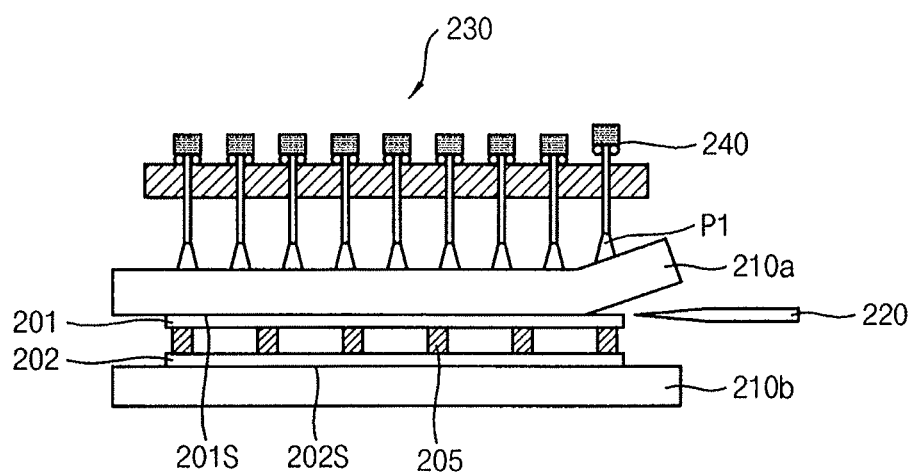

Referring to FIG. 4, vacuum pads 230 are attached to the first sub-substrate 210a of the liquid crystal display panel, which is partially detached from the first substrate 201. The vacuum pads 230 include a plurality of pads 240. The plurality of pads 240 are arranged in a matrix pattern of a plurality of rows and a plurality of columns.

The plurality of pads 240 includes fixing pads, e.g., the plurality of pads 240 includes a fixing pad P1. Once the separating member 220 partially separates an edge of the first sub-substrate 210a from the first substrate 201, the fixing pad P1 is lifted to detach the edge of the first sub-substrate 210a from the first substrate 201. Once the edge is separated, the fixing pad P1 is dropped back on the edge of the first sub-substrate 210a, such that entire first sub-substrate 210a contacts the first substrate 201.

The fixing pad P1 is attached to the first sub-substrate 210a before the first sub-substrate 210a is completely detached from the first substrate 201, e.g., the fixing pad P1 may maintain the edge of the first sub-substrate 210a on the first substrate 201 until all other portions of the first sub-substrate 210a are separated from the first substrate 201. Thus, the fixing pad P1 affixes the plurality of pads 240 to the first sub-substrate 210a.

Figure 5:
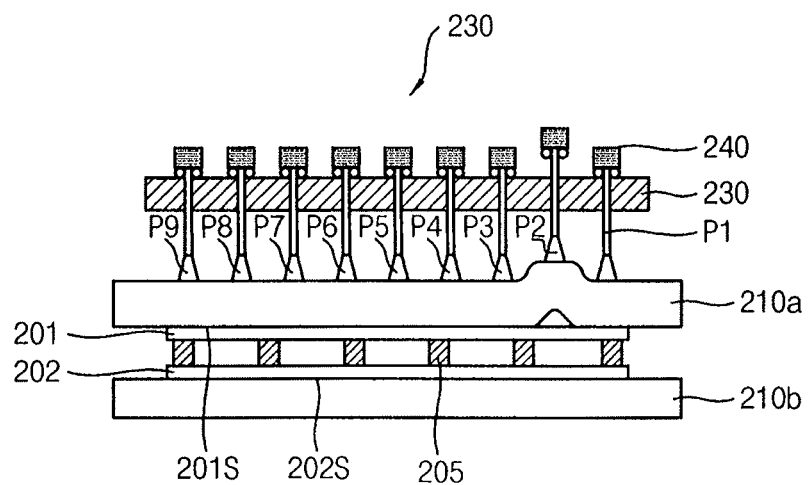

Referring to FIG. 5, a plurality of pads of the plurality of pads 240 are lifted, e.g., a plurality of pads other than the fixing pad P1 are lifted in a predetermined order. For example, a plurality of pads P2 adjacent to the fixing pad P1 may be lifted. Thus, a portion of the first sub-substrate 210a which is attached to the pads P2 is separated from the first substrate 201. A separating sequence of the pads 240, i.e., an order in which the pads 240 are lifted, will be described in FIGS. 6 to 8.

Figure 6:
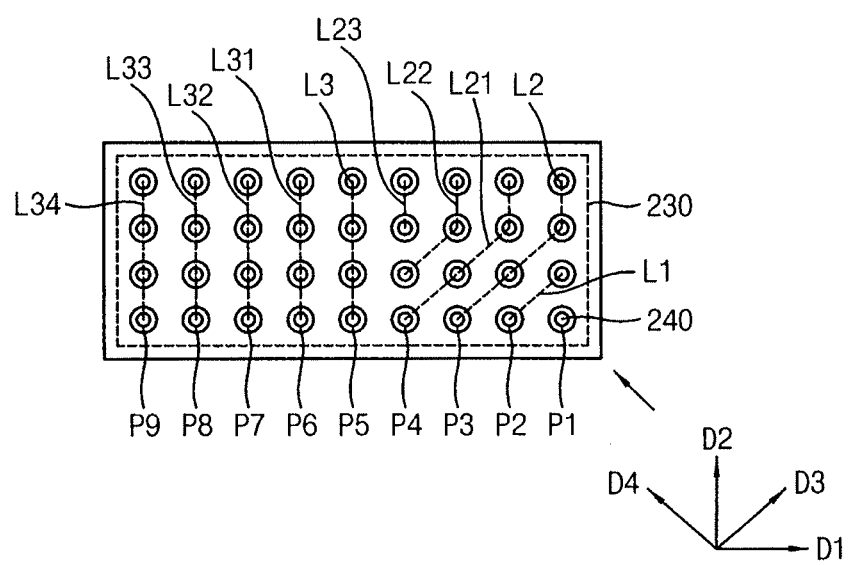
FIG. 6 illustrates a plan view of a plurality of pads attached to a sub-substrate in accordance with an example embodiment.

FIG. 6 is a plan view of the plurality of pads 240 attached to the first sub-substrate 210a, and a separating sequence of the pads 240 in accordance with an example embodiment.

The pads 240 are lifted to detach the first sub-substrate 210a from the first substrate 201. For example, the pads 240 include a plurality of pads. e.g., pads P1, P2, P3, P4, P5, P6, P7, P8 and P9. The plurality of pads 240 are arranged in a matrix form.

The first sub-substrate 210a is detached from the first substrate 201. The detaching process in FIG. 6 is performed from a first edge of the first sub-substrate 210a to a second edge of the first sub-substrate 210a, e.g., the first and second edges may be diagonally opposite to each other. The first edge of the first sub-substrate 210a is maintained on the first substrate 201 with the fixing pad P1, as described previously with reference to FIG. 5.

Next, first pads P2, e.g., only first pads P2, among the plurality of pads 240 are lifted. The first pads P2 may be arranged along a first line L1 (dashed line in FIG. 6) that is substantially parallel with a third direction D3 crossing the first direction D1 and the second direction D2. For example, an angle between the first direction D1 and the third direction D3 may be about 45 degrees, and an angle between the second direction D2 and the third direction D3 may be about 45 degrees. As the first pads P2 are lifted, only a portion of the first sub-substrate 210a attached to the first pads P2 is lifted to detach from the first substrate 201, as illustrated in FIG. 5.

Next, second pads P3 among the plurality of pads 240 are lifted. The second pads P3 may be arranged along a second line L2. A first portion of the second line L2 is substantially parallel with the second direction D2, and a second portion of the second line L2 is substantially parallel with the third direction D3. Therefore, a first set of the second pads P3, e.g., at least two of the second pads P3, may be arranged in the second direction D2. A second set, e.g., at least two, of the second pads P3 may be arranged in the third direction D3. Thus, a portion of the first sub-substrate 210a attached to the second pads P3 arranged along the second line L2 is lifted to detach the first sub-substrate 210a from the first substrate 201. Similarly, pads P4 arranged along line L21, line L22, and line L23 may be sequentially lifted.

Further, third pads P5 among the plurality of pads 240 are lifted. The third pads P5 may be arranged along a third line L3 that is substantially parallel with the second direction D2. Thus, the first sub-substrate 210a attached to the third pads P5 arranged along the third line L3 is lifted to detach the first sub-substrate 210a from the first substrate 201. Similarly, pads P6 arranged along line L31, pads P7 arranged along line L32, pads P8 arranged along line L33, and pads P9 arranged along line L34 are sequentially lifted. Once pads P2 through P9 are lifted, the fixing pad P1 of the plurality of pads 240 is lifted. Accordingly, the first sub-substrate 210a is completely detached from the first substrate 201.

The structure including the first substrate 201, the second substrate 202, and the second sub-substrate 210b may be overturned. Next, to detach the second sub-substrate 210b from the second substrate 202, the plurality of pads 240 may be attached to a surface of the second sub-substrate 210b attached to the second substrate 202. The second sub-substrate 210b may be detached in a substantially same way as the first sub-substrate 210a described previously.

In detail, the second sub-substrate 210b may be partially separated from the second substrate 203 to easily detach the second sub-substrate 210b from the second substrate 202. The separating member 220 may be inserted at a second edge of a second surface 202S (FIG. 3) between the second sub-substrate 210b and the second substrate 202 to partially detach the second sub-substrate 210b from the second substrate 202. Thus, a condition capable of easily separating the second sub-substrate 210b from the second substrate 202 may be formed. For example, the separating member 220 may include a knife having a sharp blade.

The second substrate 202 may have a rectangular shape. The second substrate 202 may have first and second sides extending in the first direction D1 and third and fourth sides extending in the second direction D2.

The vacuum pads 230 are attached to partially detach the second sub-substrate 210b of the liquid crystal display panel. The vacuum pads 230 include the plurality of pads 240. The plurality of pads 240 are arranged in a matrix form including a plurality of rows and a plurality of columns.

A method of detaching the second sub-substrate 210b from the second substrate 202 may be substantially the same as the method of detaching the first sub-substrate 210a from the first substrate 201 in FIG. 6. Thus, any further detailed descriptions concerning the same elements will be omitted.

Figure 7:
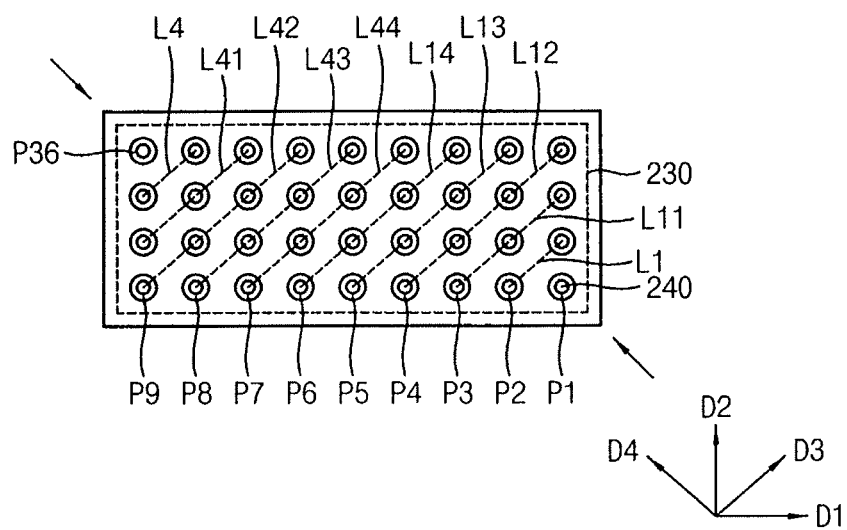
FIG. 7 illustrates a plan view of a plurality of pads attached to a sub-substrate in accordance with another example embodiment.

FIG. 7 is a plan view of the plurality of pads 240 attached to the sub-substrate 210a, and a separating sequence of the pads 240 in accordance with another example embodiment.

Referring to FIG. 7, vacuum pads 230 are attached to the first sub-substrate 210a of the liquid crystal display panel which is partially detached from the first substrate 201. The vacuum pads 230 include the plurality of pads 240. The plurality of pads 240 are arranged in a matrix form including a plurality of rows and a plurality of columns.

The plurality of pads 240 includes the first fixing pad P1 and a second fixing pad P36. The first fixing pad P1 is attached to a first edge of the first sub-substrate 210a, and the second fixing pad P36 is attached to a second edge of the first sub-substrate 210a. A fourth direction D4 crosses the first direction D1, the second direction D2, and the third direction D3. For example, an angle between the second direction D2 and the fourth direction D4 may be about 45 degrees, and an angle between the third direction D3 and the fourth direction D4 may be about 90 degrees.

In an example embodiment, the elements of the second fixing pad P36 may be substantially the same as the elements of the first fixing pad P1. The first fixing pad P1 and the second fixing pad P36 are lifted to detach the first and second edges of the first sub-substrate 210a from the first substrate 201. The first and second edges of the first sub-substrate 210a are contacted with the first substrate 201 by falling, e.g., dropping, the first fixing pad P1 and the second fixing pad P36.

The first fixing pad P1 and the second fixing pad P36 are attached to the first sub-substrate 210a before the first sub-substrate 210a is completely detached from the first substrate 201. Thus, the first fixing pad P1 and the second fixing pad P36 serve to fix the plurality of pads 240 to the first sub-substrate 210a.

The pads 240 are lifted to detach the first sub-substrate 210a from the first substrate 201. The pads 240 include the plurality of pads P1, P2, P3, P4, P5, P6, P7, P8 and P9. The plurality of pads is arranged in a matrix form.

The first sub-substrate 210a is detached from the first substrate 201. The detaching process is performed from the first and second edges of the first sub-substrate 210a toward a center portion of the first sub-substrate 210a.

First pads among the plurality of pads 240 are lifted. The first pads may be arranged along the first line L1 that is substantially parallel with the third direction D3 crossing the first direction D1 and the second direction D2. The first pads arranged along the first line L1 are indicated by the dotted line L1 in FIG. 7. Thus, the first sub-substrate 210a attached to the first pads arranged along the first line L1 is lifted to detach the first sub-substrate 210a from the first substrate 201. Similarly, pads P2 through P6 arranged along respective lines L11, L12, L13, and pads L14 are sequentially lifted.

Second pads among the plurality of pads are lifted. The second pads may be arranged along a fourth line L4 that is substantially parallel with the third direction D3. The second pads arranged along the fourth line L4 are indicated by the dotted line L4 in FIG. 7. Thus, the first sub-substrate 210a attached to the second pads arranged along the fourth line L4 is lifted to detach the first sub-substrate 210a from the first substrate 201. Similarly, pads P7 through P9 arranged along lines L41, L42, L43, and L44 are sequentially lifted.

In an example embodiment, the first pads arranged along the first line L1 and the second pads arranged along the fourth line L4 may be substantially simultaneously lifted. The pads arranged along the line L11 and the pads arranged along the line L41 may be substantially simultaneously lifted. The pads arranged along the line L12 and the pads arranged along the line L42 may be substantially simultaneously lifted. The pads arranged along the line L13 and the pads arranged along the line L43 may be substantially simultaneously lifted. The pads arranged along the line L14 and the pads arranged along the line L44 may be substantially simultaneously lifted.

The first fixing pad P1 and the second fixing pad P36 of the plurality of pads 240 are lifted, e.g., the first and second fixing pads P1 and P36 may be lifted after lifting of pads P2 through P9. Accordingly, the first sub-substrate 210a is completely detached from the first substrate 201.

In an example embodiment, the first pads among the plurality of pads 240 arranged along the first line L1 are lifted from the first edge of the first sub-substrate 210a. The second pads among the plurality of pads 240 arranged along the fourth line L4 are lifted from the second edge of the first sub-substrate 210a to detach the first sub-substrate 210a from the first substrate 201. Thus, the first sub-substrate 210a may be quickly and easily detached from the first substrate 201 by lifting the first pads among the plurality of pads 240 arranged along the first line L1 and the second pads among the plurality of pads 240 arranged along the fourth line L4.

The structure including the first substrate 201, the second substrate 202, and the second sub-substrate 210b may be overturned. To detach the second sub-substrate 210b from the second substrate 202, the plurality of pads 240 may be attached to a surface of the second sub-substrate 210b attached to the second substrate 202.

The second sub-substrate 210b may be partially separated from the second substrate 203 to easily detach the second sub-substrate 210b from the second substrate 202. The separating member 220 may be inserted in the second edge of the second surface 202S between the second sub-substrate 210b and the second substrate 202 to partially detach the second sub-substrate 210b from the second substrate 202. Thus, a condition capable of easily separating the second sub-substrate 210b from the second substrate 202 may be formed. For example, the separating member 220 may include a knife having a sharp blade.

The second substrate 202 may have a rectangular shape. The second substrate 202 may have first and second sides extending in the first direction D1 and third and fourth sides extending in the second direction D2.

Vacuum pads 230 are attached to partially detach the second sub-substrate 210b of the liquid crystal display panel. The vacuum pads 230 include the plurality of pads 240. The plurality of pads 240 are arranged in a matrix form including a plurality of rows and a plurality of columns.

A method of detaching the second sub-substrate 210b from the second substrate 202 may be substantially the same as the method of detaching the first sub-substrate 210a from the first substrate 201 in FIG. 7. Thus, any further detailed descriptions concerning the same elements will be omitted.

Figure 8:
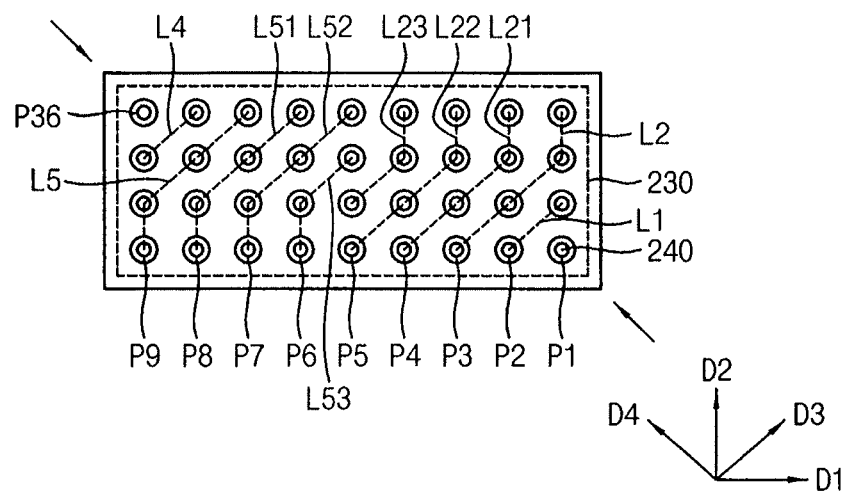
FIG. 8 illustrates a plan view of a plurality of pads attached to a sub-substrate in accordance with yet another example embodiment.

FIG. 8 is a plan view of the plurality of pads 240 attached to the sub-substrate 210a, and a separating sequence of the pads 240 in accordance with yet another example embodiment.

Referring to FIG. 8, vacuum pads 230 are attached to the first sub-substrate 210a of the liquid crystal display panel which is partially detached from the first substrate 201. The vacuum pads 230 include the plurality of pads 240. The plurality of pads 240 are arranged in a matrix form including a plurality of rows and a plurality of columns.

The plurality of pad 240 includes the first fixing pad P1 and the second fixing pad P36. The first fixing pad P1 is attached to a first edge of the first sub-substrate 210a and the second fixing pad P36 is attached to a second edge of the first sub-substrate 210a. In an example embodiment, the elements of the second fixing pad P36 may be substantially the same as the elements of the first fixing pad P1.

The first fixing pad P1 and the second fixing pad P36 are lifted to detach the first and second edges of the first sub-substrate 210a from the first substrate 201. The first and second edges of the first sub-substrate 210a are contacted with the first substrate 201 by falling, e.g., dropping, the first fixing pad P1 and the second fixing pad P36.

The first fixing pad P1 and the second fixing pad P36 are attached to the first sub-substrate 210a before the first sub-substrate 210a is completely detached from the first substrate 201. Thus, the first fixing pad P1 and the second fixing pad P2 serve to fix the plurality of pads 240 to the first sub-substrate 210a.

The pads 240 are lifted to detach the first sub-substrate 210a from the first substrate 201. The pads 240 include a plurality of pads P1, P2, P3, P4, P5, P6, P7, P8 and P9. The plurality of pads is arranged in a matrix form.

The first sub-substrate 210a is detached from the first substrate 201. The detaching process is performed from the first and second edges of the first sub-substrate 210a to a center portion of the first sub-substrate 210a.

First pads among the plurality of pads 240 are lifted. The first pads may be arranged along the first line L1 that is substantially parallel with the third direction D3 crossing the first direction D1 and the second direction D2. The first pads arranged along the first line L1 is indicated by the dotted line L1 in FIG. 8. Thus, the first sub-substrate 210a attached to the first pads arranged along the first line L1 is lifted to detach the first sub-substrate 210a from the first substrate 201.

Second pads among the plurality of pads 240 are lifted. The second pads may be arranged along the fourth line L4. The fourth line L4 is substantially parallel with the third direction D3. The second pads may be arranged in the third direction D3. The second pads arranged along the fourth line L4 is indicated by the dotted line L4 in FIG. 8. Thus, the first sub-substrate 210a attached to the second pads arranged along the fourth line L4 is lifted to detach the first sub-substrate 210a from the first substrate 201. In an example embodiment, the first pads and the second pads may be substantially simultaneously lifted.

Third pads among the plurality of pads 240 are lifted. The third pads may be arranged along a second line L2. A portion of the second line L2 is substantially parallel with the second direction D2, and another portion of the second line L2 is substantially parallel with the third direction D3. Some of the third pads may be arranged in the second direction D2. The other of the third pads may be arranged in the third direction D3. The third pads arranged along the second line L2 is indicated by the dotted line L2 in FIG. 8. Thus, the first sub-substrate 210a attached to the third pads arranged along the second line L2 is lifted to detach the first sub-substrate 210a from the first substrate 201.

Fourth pads among the plurality of pads 240 are lifted. The fourth pads may be arranged along the fifth line L5. A portion of the fifth line L5 is substantially parallel with the second direction D2, and another portion of the fifth line L5 is substantially parallel with the third direction D3. Some of the fourth pads may be arranged in the second direction D2. The other of the fourth pads may be arranged in the third direction D3. The fourth pads arranged along the fifth line L5 is indicated by a dotted line L5 in FIG. 8. Thus, the first sub-substrate 210a attached to the fourth pads arranged along the fifth line L5 is lifted to detach the first sub-substrate 210a from the first substrate 201. In an example embodiment, the third pads and the fourth pads may be substantially simultaneously lifted.

Similarly, pads arranged along a line L21, pads arranged along the line L22 and pads arranged along the line L23 are sequentially lifted. In addition, pads arranged along a line L51, pads arranged along a line L52 and pads arranged along a line L53 are sequentially lifted. In an example embodiment, the pads arranged along the line L21 and the pads arranged along the line L51 may be substantially simultaneously lifted. The pads arranged along the line L22 and the pads arranged along the line L52 may be substantially simultaneously lifted. The pads arranged along the line L23 and the pads arranged along the line L53 may be substantially simultaneously lifted.

The first fixing pad P1 and the second fixing pad P36 of the plurality of pads 240 are lifted. Accordingly, the first sub-substrate 210a is completely detached from the first substrate 201.

In an example embodiment, the pads among the plurality of pads 240 arranged along the first line L1, the second line L2, the lines L21, L22 and L23 are lifted from the first edge of the first sub-substrate 210a to detach the first sub-substrate 210a from the first substrate 201. Thus, the first sub-substrate 210a may be quickly and easily detached from the first substrate 201 by lifting the first pads among the plurality of pads 240 arranged along the first line L1 and the second pads among the plurality of pads 240 arranged along the second line L2, the lines L21, L22 and L23.

In an example embodiment, the pads among the plurality of pads 240 arranged along the fourth line L4, the fifth line L5, the lines L51, L52 and L53 are lifted from the second edge of the first sub-substrate 210a to detach the first sub-substrate 210a from the first substrate 201. Thus, the first sub-substrate 210a may be quickly and easily detached from the first substrate 201 by lifting the third pads among the plurality of pads 240 arranged along the fourth line L4 and the fourth pads among the plurality of pads 240 arranged along the fifth line L5, the lines L51, L52 and L53.

The structure including the first substrate 201, the second substrate 202, and the second sub-substrate 210b may be overturned. To detach the second sub-substrate 210b from the second substrate 202, the plurality of pads 240 may be attached to a surface of the second sub-substrate 210b attached to the second substrate 202.

The second sub-substrate 210b may be partially separated from the second substrate 203 to easily detach the second sub-substrate 210b from the second substrate 202. The separating member 220 may be inserted in the second edge of the second surface 202S between the second sub-substrate 210b and the second substrate 202 to partially detach the second sub-substrate 210b from the second substrate 202. Thus, a condition capable of easily separating the second sub-substrate 210b from the second substrate 202 may be formed. For example, the separating member 220 may include a knife having a sharp blade.

The second substrate 202 may have a rectangular shape. The second substrate 202 may have first and second sides extending in the first direction D1 and third and fourth sides extending in the second direction D2 crossing the first direction D1.

The vacuum pads 230 are attached to partially detach the second sub-substrate 210b of the liquid crystal display panel. The vacuum pads 230 include the plurality of pads 240. The plurality of pads 240 are arranged in a matrix of a plurality of rows and a plurality of columns.

A method of detaching the second sub-substrate 210b from the second substrate 202 may be substantially the same as the method of detaching the first sub-substrate 210a from the first substrate 201 in FIG. 8. Thus, any further detailed descriptions concerning the same elements will be omitted.

By way of summation and review, in a method of manufacturing a conventional LCD device, a plastic film may be laminated on a carrier substrate, a TFT process may be performed on the plastic film, and then the carrier substrate is detached from the plastic film. In the process of detaching the carrier substrate from the plastic film, since the plastic film and the carrier substrate may be tightly adhered to each other at high temperature, it may be difficult to detach the carrier substrate from the plastic film.

Therefore, according to example embodiments, a method is provided to easily detach a sub-substrate from a substrate. Thus, damage of an ultra thin liquid crystal display device may be prevented or substantially minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A method of detaching a sub-substrate from a substrate, the method comprising:
   providing a first sub-substrate attached to a first substrate, the first substrate having a rectangular shape with first and second sides extending in a first direction and third and fourth sides extending in a second direction crossing the first direction;
   inserting a separating member between the first sub-substrate and the first substrate to partially detach the first sub-substrate from the first substrate;
   attaching a plurality of pads to the first sub-substrate, the plurality of pads being arranged in a matrix of a plurality of rows and a plurality of columns;
   lifting first pads among the plurality of pads, the first pads being arranged in a third direction diagonal with respect to the first and second directions;

lifting second pads among the plurality of pads, after lowering the first pads, at least two of the second pads being arranged in the second direction, and at least two of the second pads being arranged in the third direction; and lifting third pads among the plurality of pads, the third pads being arranged in the second direction.

2. The method as claimed in claim 1, wherein:
the plurality of pads includes a fixing pad attached to an edge of the first sub-substrate, and
the method further comprises:
before lifting the first pads, separating the edge of the first sub-substrate from the first substrate by lifting the fixing pad; and
dropping the fixing pad back on the edge of the first sub-substrate, such that the first sub-substrate contacts the first substrate.

3. The method as claimed in claim 1, wherein a thickness of the first substrate is about 0.01 mm to about 0.1 mm.

4. The method as claimed in claim 1, wherein a thickness of the first sub-substrate is about 0.3 mm to about 0.7 mm.

5. The method as claimed in claim 1, further comprising:
providing a second substrate opposite to the first substrate and a second sub-substrate attached to the second substrate; and
combining the first substrate with the second substrate.

6. The method as claimed in claim 5, wherein a thickness of the second substrate is about 0.01 mm to about 0.1 mm.

7. The method as claimed in claim 5, wherein a thickness of the second sub-substrate is about 0.3 mm to about 0.7 mm.

8. The method as claimed in claim 1, wherein:
lifting the second pads includes sequentially lifting at least first and second groups of second pads, after lowering the first pads, and
each of the first and second groups is lifted simultaneously, each of the first and second groups including two second pads arranged in the second direction and two second pads arranged in the third direction.

9. A method of detaching a sub-substrate from a substrate, the method comprising:
providing a first sub-substrate attached to a first substrate, the first substrate having a rectangular shape with first and second sides extending in a first direction and third and fourth sides extending in a second direction crossing the first direction;
inserting a separating member between the first sub-substrate and the first substrate to partially detach the first-sub substrate from the first substrate;
attaching a plurality of pads to the first sub-substrate, the plurality of pads being arranged in a matrix of a plurality of rows and a plurality of columns;
substantially simultaneously lifting first pads and second pads among the plurality of pads, the first pads being adjacent to a first edge of the first substrate and being arranged in a third direction diagonal with respect to the first and the second directions, and the second pads being adjacent to a second edge of the first substrate and being arranged in the third direction, the first and second edges being on opposite sides of a diagonal of the rectangular shape of the first substrate.

10. The method as claimed in claim 9, wherein:
the plurality of pads includes a first fixing pad attached to the first edge of the first sub-substrate, and a second fixing pad attached to the second edge of the first sub-substrate, and
the method further comprises:
before lifting the first and second pads, separating the first and second edges of the first sub-substrate from the first substrate by lifting the first fixing pad and the second fixing pad; and
dropping the first and second fixing pads back on the first and second edges of the first sub-substrate, respectively, such that the first and second sub-substrates contact the first and second substrates, respectively.

11. The method as claimed in claim 9, wherein a thickness of the first substrate is about 0.01 mm to about 0.1 mm.

12. The method as claimed in claim 9, wherein a thickness of the first sub-substrate is about 0.3 mm to about 0.7 mm.

13. The method as claimed in claim 9, further comprising:
providing a second substrate opposite to the first substrate and a second sub-substrate attached to the second substrate; and
joining the first substrate with the second substrate.

14. A method of detaching a sub-substrate from a substrate, the method comprising:
providing a first sub-substrate attached to a first substrate, the first substrate having a rectangular shape with first and second sides extending in a first direction and third and fourth sides extending in a second direction crossing the first direction;
inserting a separating member between the first sub-substrate and the first substrate to partially detach the first sub-substrate from the first substrate;
attaching a plurality of pads to the first sub-substrate, the plurality of pads being arranged in a matrix of a plurality of rows and a plurality of columns;
substantially simultaneously lifting first pads and second pads among the plurality of pads, the first pads being adjacent to a first edge of the first substrate and being arranged in a third direction diagonal with respect to the first and second directions, and the second pads being adjacent to a second edge and being arranged in the third direction, the first and second edges being on opposite sides of a diagonal of the rectangular shape of the first substrate; and
substantially simultaneously lifting third pads and fourth pads among the plurality of pads, the third pads being adjacent to the first edge, some of the third pads being arranged in the second direction, other of the third pads being arranged in the third direction, the fourth pads being adjacent to the second edge, some of the fourth pads being arranged in the second direction, and other of the fourth pads being arranged in the third direction.

15. The method as claimed in claim 14, wherein:
the plurality of pads includes a first fixing pad attached to the first edge of the first sub-substrate and a second fixing pad attached to the second edge of the first sub-substrate, and
the method further comprises:
before lifting the first and second pads, separating the first and second edges of the first sub-substrate from the first substrate by lifting the first fixing pad and the second fixing pad; and
dropping the first and second fixing pads back on the first and second edges of the first sub-substrate, respectively, such that the first and second sub-substrates contact the first and second substrates, respectively.

16. The method as claimed in claim 14, wherein a thickness of the first substrate is about 0.01 mm to about 0.1 mm.

17. The method as claimed in claim 14, wherein a thickness of the first sub-substrate is about 0.3 mm to about 0.7 mm.

18. The method as claimed in claim 14, further comprising:
 providing a second substrate opposite to the first substrate and a second sub-substrate attached to the second substrate; and
 joining the first substrate with the second substrate.

* * * * *